April 28, 1942.    C. L. JONES    2,280,917
MOUNTING FOR PROTECTIVE DISCHARGE DEVICES
Filed Feb. 23, 1939
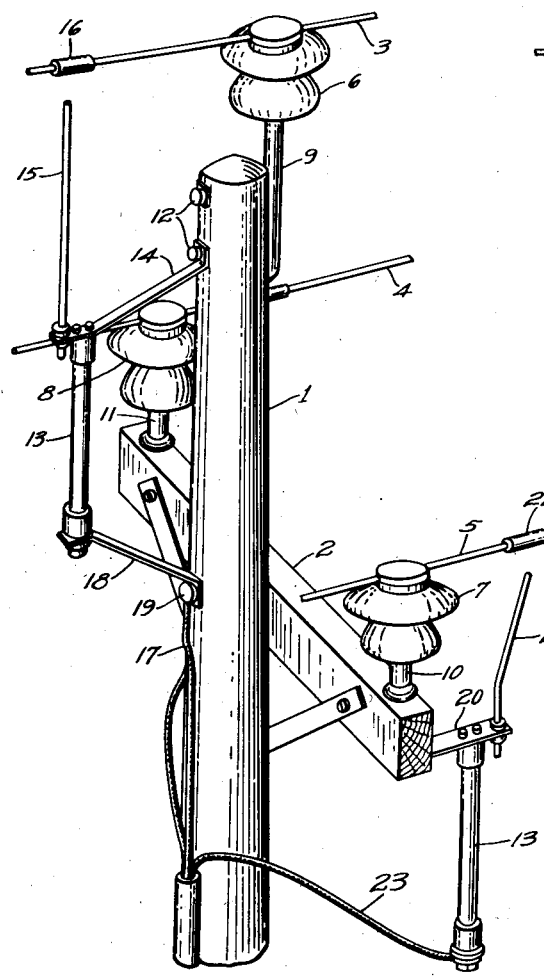
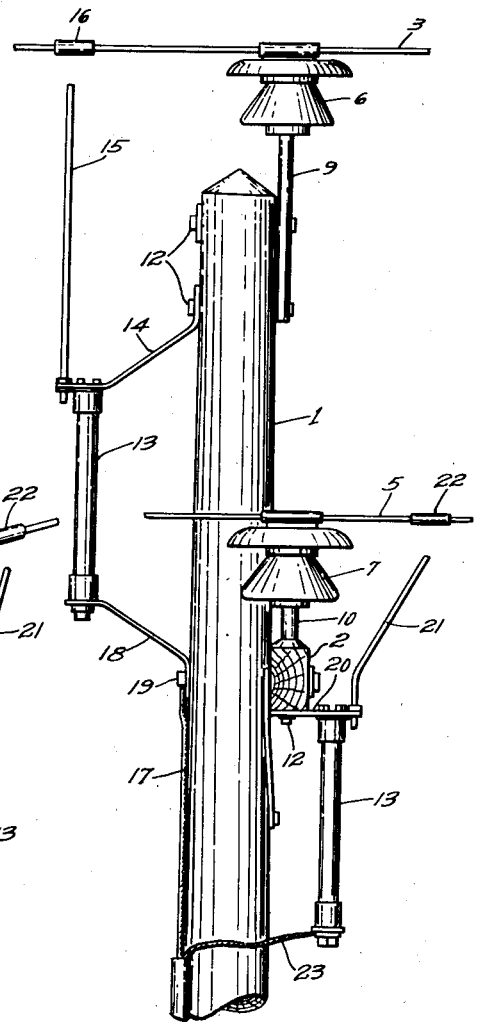
WITNESSES:
INVENTOR
Charles L. Jones.
BY
ATTORNEY Patented Apr. 28, 1942

2,280,917

UNITED STATES PATENT OFFICE 2,280,917

MOUNTING FOR PROTECTIVE DISCHARGE DEVICES

Charles L. Jones, Dormont, Pa., assignor to Westinghouse Electric & Manufacturing Company, East Pittsburgh, Pa., a corporation of Pennsylvania Application February 23, 1939, Serial No. 257,868

3 Claims. (Cl. 175—30)

The present invention relates to the protection of electrical transmission or distribution lines against lightning or other voltage surges, and, more particularly, to an improved mounting for overvoltage discharge devices used for the protection of overhead lines supported on wood poles.

The invention relates particularly to over-voltage discharge devices of the type in which an arc discharge takes place in a tube or chamber composed of or containing a material which evolves large quantities of deionizing gas in the presence of an arc. When a surge voltage is applied to a discharge device of this type, it breaks down and an arc is formed, permitting the flow of surge current to ground. The arc causes large quantities of deionizing gas to be evolved, so that after the surge has disappeared the arc is prevented from reestablishing itself after the first current-zero. This type of discharge device is commonly known as a protector tube and will be so referred to in this specification.

Protector tubes of the type described are often used for the protection of overhead transmission or distribution lines against lightning, or other voltage surges. When used for this purpose, they are customarily mounted on brackets or other supporting structures which are secured to the pole or cross arm on which the line conductors are supported. In many cases, this method of mounting requires cumbersome and relatively expensive equipment and it also usually involves considerable expense and difficulty in installing these structures, since special clamps and drilling of the poles are usually necessary.

When mounted on poles in this way, the tubes have one end connected to ground, while the other end is connected to a line conductor, usually through an external spark gap which isolates the protector from the line under normal conditions. When protector tubes are installed in this way on wood poles, it sometimes happens that, when a lightning surge occurs, the insulator which supports the conductor on the pole flashes over before the protector tube operates. When this occurs, the lightning surge is discharged through the pole itself, and the pole is often destroyed or seriously damaged, resulting in an outage on the line and occasioning the difficulty and expense of replacing the pole and the equipment carried by it.

The object of the present invention, therefore, is to provide an improved mounting for overvoltage discharge devices for the protection of overhead transmission or distribution lines which will be simple and inexpensive to install and which will provide protection for the poles themselves as well as for the conductors and insulators carried by them.

Further objects and advantages will be apparent from the following detailed description taken in connection with the accompanying drawing, in which:

Figure 1 is a perspective view of the top portion of a transmission line pole, and Fig. 2 is a side elevational view of the same pole.

The drawing shows a wood pole 1, having a cross arm 2, on which is supported a three-phase transmission or distribution line comprising the three phase conductors 3, 4 and 5. The conductors are supported by pin type insulators 6, 7 and 8, respectively, and the insulators are mounted on conducting pins 9, 10 and 11, which are secured to the pole and cross arm, respectively, by bolts 12 in the usual manner. Suitable bracing members may be provided for the cross arm, and such members are preferably made of insulating material or else should be arranged with their ends spaced a sufficient distance from the insulators to prevent the possibility of surge current passing through the bracing members to ground.

The line is protected against lightning by means of overvoltage discharge devices 13 of the protector tube type, one of which may be provided for each conductor. In accordance with the present invention each protector tube is provided with a mounting member or bracket which is adapted to be fastened under the bolt which secures the pin of the corresponding insulator to the pole or cross arm. In this way a very simple mounting is provided which is readily installed, since the bolts are already in place and no extra drilling is necessary and no special clamps or other appliances are required. This method also has the very great advantage of mounting the protector tube in such a way that a conducting path is provided from the insulator through the tube to ground in parallel with the pole, so that in case of flashover of the insulator the surge current will pass through the mounting bracket and be discharged through the protector tube rather than the pole. In this way, damage to the pole by the surge current in case of flashover of the insulator is prevented, and no damage to the insulator occurs since the protector tube interrupts the power follow current at the first current-zero before it has had time to injure the insulator.

This mounting method may be carried out in various ways, as illustrated in the drawing. Thus, the tube 13 for the protection of the conductor 3 has a mounting bracket 14 of conducting material, such as steel, which is secured in conducting relation to the upper end of the protector tube at one end, and at its other end is fastened under the bolt 12 which secures the pin 9 of the insulator 6 to the pole. The protector tube 13 may be connected to the conductor 3 through a horn 15 which is arranged to provide a suitable series gap between the tube and the conductor to isolate it from the line under normal conditions. A shield 16 of any suitable conducting material is provided on the conductor to prevent burning by the arc which is formed when the gap breaks down. The lower end of the protector tube 13 is connected to ground by means of a cable 17. If desired, the lower end of the tube may be supported by a second bracket 18 to give it greater stability, and in the construction shown, this bracket may conveniently be fastened under the bolt 19 which secures the cross arm to the pole. If a bracket is used at the lower end of the protector tube, it should be so arranged that the flashover distance between the two brackets is substantially greater than the length of the tube, so as to avoid any possibility of flashover outside the tube.

The protector tubes for the conductors 4 and 5 may be similarly mounted and, as shown for the conductor 5, the tube 13 is secured at its upper end to a bracket member 20 which extends out horizontally from the cross arm, and is preferably fastened under the bolt 12 which secures the pin 10 to the cross arm, although it may be separately secured to the cross arm and electrically connected to the bolt. This bracket may also carry a horn 21 which serves to connect the protector tube 13 to the line conductor 5 through a series gap formed between the horn and a shield member 22 surrounding the conductor. The lower end of the protector tube is connected to ground by a cable 23, which may be joined to the cable 17. It will be understood, of course, that the conductor 4 is provided with a protector tube 13 which may be mounted in a similar manner to that of the conductor 5.

In normal operation, when a lightning surge occurs, the series gap between the protector tube and the line will break down and the surge will be discharged through the tube to ground. If the corresponding insulator flashes over, however, before the gap breaks down, the surge current will flow through the insulator pin, the bolt securing it to the pole, the mounting bracket fastened under this bolt, and the protector tube to ground. Thus, a path is provided between the insulator and ground in parallel with the pole so that in case of flashover of the insulator the pole is protected and no damage will be done to it. In effect, the gap and the insulator are connected in parallel between the protector tube and the line, and whether the gap breaks down or the insulator flashes over, the result is the same, since the surge is discharged through the tube to ground in either case. It is possible and, in many cases, preferable to omit the horns entirely, since equally good protection against outages is obtained without danger of injury to the pole or insulators. Another advantage of this mounting lies in its extreme simplicity, since it can be readily applied to existing structures without requiring any special appliances or fixtures or any drilling of the wood. A further advantage of this type of mounting is that it is readily adaptable to structures which do not lend themselves to proper clearances for the tubes with other types of mountings and it can be used where the insulator flashover voltage is less than the breakdown voltage of the tube, which could not be done with the conventional mounting of the tube, in parallel with the insulator.

It will be seen, therefore, that a very simple and inexpensive mounting has been provided for overvoltage discharge devices for the protection of overhead transmission or distribution lines, and that this mounting, in addition to being simple and inexpensive, also provides complete and reliable protection not only for the line conductors and insulators, but also for the poles on which they are supported. Although a specific construction has been illustrated and described, it is to be understood that the invention is not limited to the exact constructional details shown, but that in its broadest aspects, it includes all equivalent modifications and embodiments which come within the scope of the appended claims.

I claim as my invention:

1. In combination, a wooden supporting structure for an overhead electrical transmission or distribution line having a plurality of conductors, an insulator mounted on the supporting structure for supporting one of said line conductors, an overvoltage discharge device mounted on the supporting structure, a common means for securing both the insulator and the discharge device to the supporting structure, the discharge device being connected in series between the insulator and ground, and a horn member mounted on the discharge device and extending towards the line conductor to form an air gap between the discharge device and the conductor in parallel with the insulator.

2. In combination, a wooden supporting structure for an overhead electrical transmission or distribution line having a plurality of conductors, an insulator for supporting one of said line conductors, a metal mounting member for said insulator, an overvoltage discharge device, a conducting bracket to which said discharge device is secured, a common conducting means for securing both said insulator mounting member and said bracket to the supporting structure, whereby the discharge device is connected in series between the insulator and ground, and means forming an air gap between the discharge device and the line conductor in parallel with the insulator.

3. In combination, a wooden supporting structure for an overhead electrical transmission or distribution line having a plurality of conductors, an insulator for supporting one of said line conductors, a metal mounting member for said insulator, an overvoltage discharge device, a conducting bracket to which said discharge device is secured, a common conducting means for securing both said insulator mounting member and said bracket to the supporting structure, whereby the discharge device is connected in series between the insulator and ground, and a horn member mounted on said bracket and extending towards the line conductor to form an air gap between the discharge device and the conductor in parallel with the insulator.

CHARLES L. JONES.